United States Patent [19]

Fergison, Jr.

[11] Patent Number: 5,290,014
[45] Date of Patent: Mar. 1, 1994

[54] COMPACT TIRE LIFT UNIT

[75] Inventor: George A. Fergison, Jr., Dayton, Ohio

[73] Assignee: Deuer Manufacturing INc., Dayton, Ohio

[21] Appl. No.: 678,605

[22] Filed: Apr. 1, 1991

[51] Int. Cl.$^5$ .............................................. B66D 1/00
[52] U.S. Cl. ...................... 254/342; 254/323; 254/376; 242/117
[58] Field of Search ............... 254/323, 325, 327, 333, 254/342, 344, 370, 371, 383, 376; 414/463, 466; 242/117, 125.1; 464/37

[56] References Cited

U.S. PATENT DOCUMENTS

| | | | |
|---|---|---|---|
| Re. 33,303 | 8/1990 | Denmann et al. | 254/323 |
| 2,019,512 | 11/1935 | Stahl | 242/117 |
| 2,686,016 | 8/1954 | Kilian | 242/317 |
| 2,830,542 | 4/1958 | Erickson et al. | 74/440 |
| 3,373,625 | 3/1968 | Keller | 74/440 |
| 3,856,167 | 12/1974 | Yasue et al. | 214/451 |
| 3,865,264 | 2/1975 | Kuhns | 214/451 |
| 3,874,536 | 4/1975 | Watanabe | 214/451 |
| 3,958,771 | 5/1976 | Everett et al. | 242/317 X |
| 4,043,437 | 8/1977 | Taylor | 464/37 X |
| 4,059,197 | 11/1977 | Iida | 214/451 |
| 4,249,682 | 2/1981 | Yasue et al. | 254/266 X |
| 4,535,973 | 8/1985 | Dorr et al. | 254/323 |
| 4,544,136 | 10/1985 | Denmann et al. | 254/323 |
| 4,625,947 | 12/1986 | Denman et al. | 254/323 |
| 4,915,358 | 4/1990 | Stallings | 254/323 |
| 4,969,630 | 11/1990 | Denman et al. | 254/323 |
| 5,060,912 | 10/1991 | Guarr | 254/323 |
| 5,120,003 | 6/1992 | Sacconi | 242/322 X |
| 5,125,628 | 6/1992 | Rempinski et al. | 254/323 |

Primary Examiner—Katherine Matecki
Attorney, Agent, or Firm—Jacox & Meckstroth

[57] ABSTRACT

A housing is formed by a plastic shroud between two metal mounting brackets, and a drive shaft is rotably supported by the brackets. A spool is mounted on the shaft for rotation and is formed by first and second powdered metal plate members which define a track within which a cable is wound upon itself in a spiral overlapping manner. The first plate member has an integral hub which defines an undercut cavity receiving a fitting secured to the inner end of the cable and also defines a set of recesses receiving lugs on the second plate member which has an integrally formed ring gear. A powdered metal control plate is integrally formed with an external gear located within the ring gear, and the ring gear has two teeth with leading and trailing surfaces in simultaneous contact with corresponding trailing and leading surfaces on the external gear for preventing backup of the spool. The cable passes through a downstop pawl which pivots to engage a notch within the spool when the cable is fully extended, and in a modification a projecting end portion of the shaft is provided with a one-way anti-theft drive coupling. A torque limiting clutch as a one-piece powdered metal clutch cam which is integral with an eccentric drive cam, and an adjacent powdered metal clutch plate carries a set of wire springs which drive the clutch cam.

4 Claims, 2 Drawing Sheets

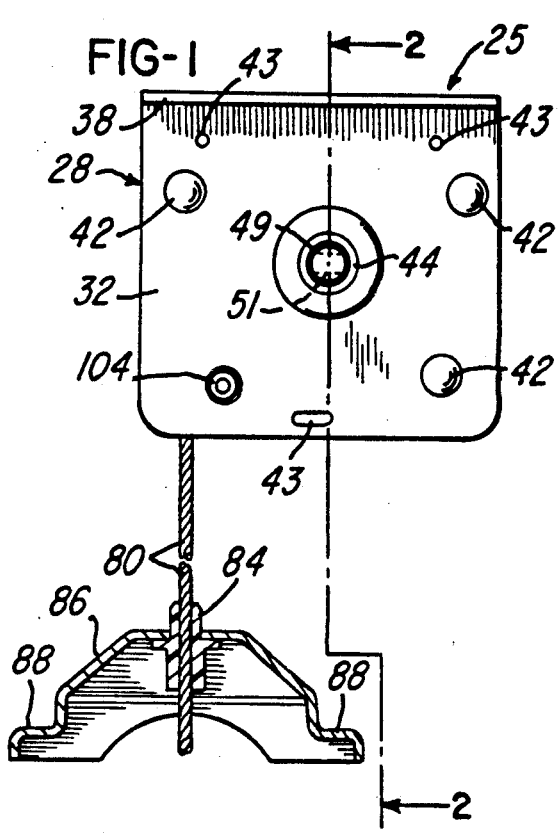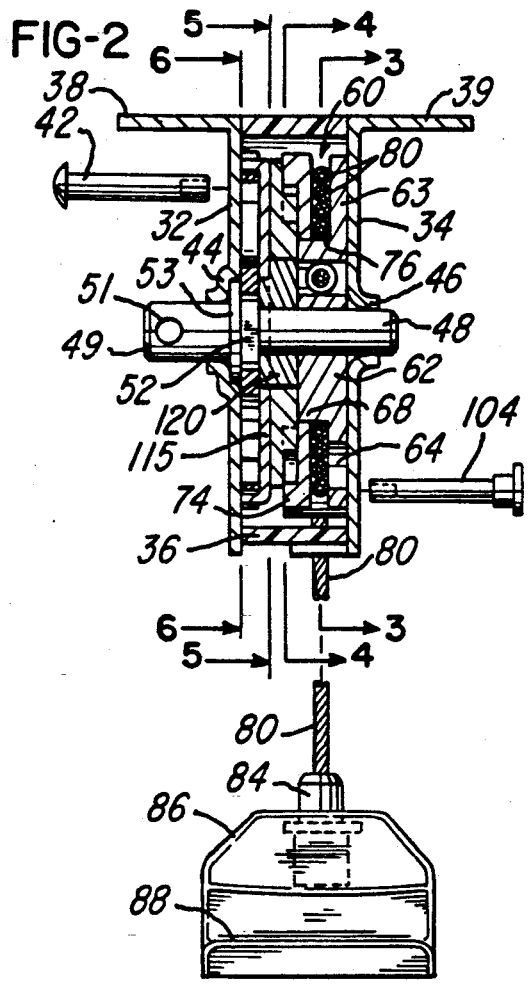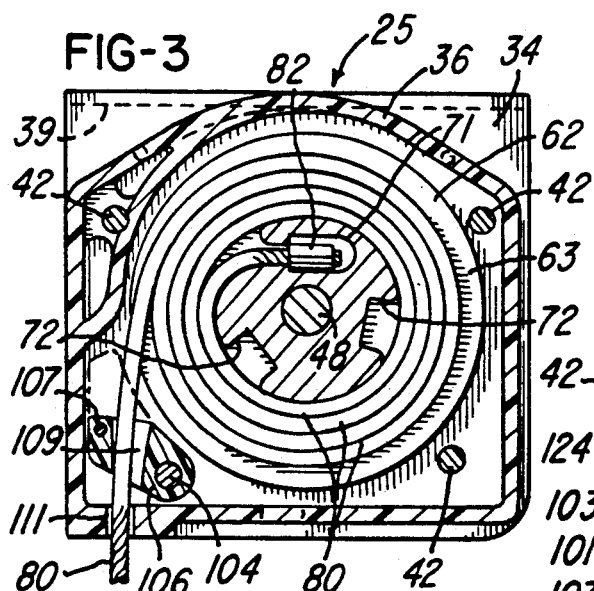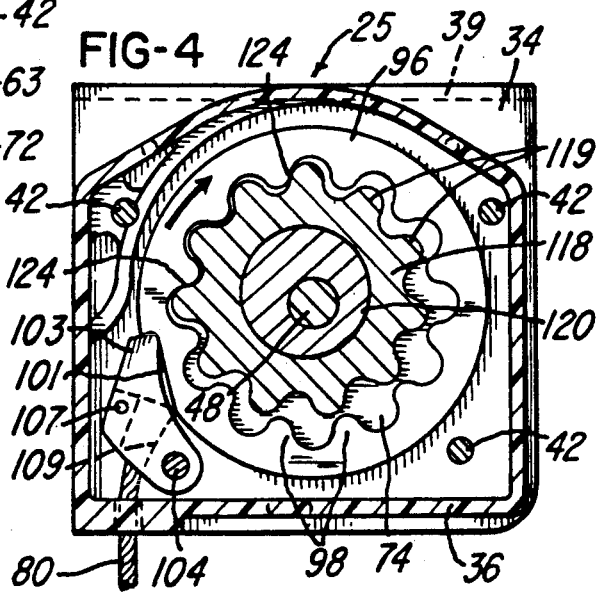

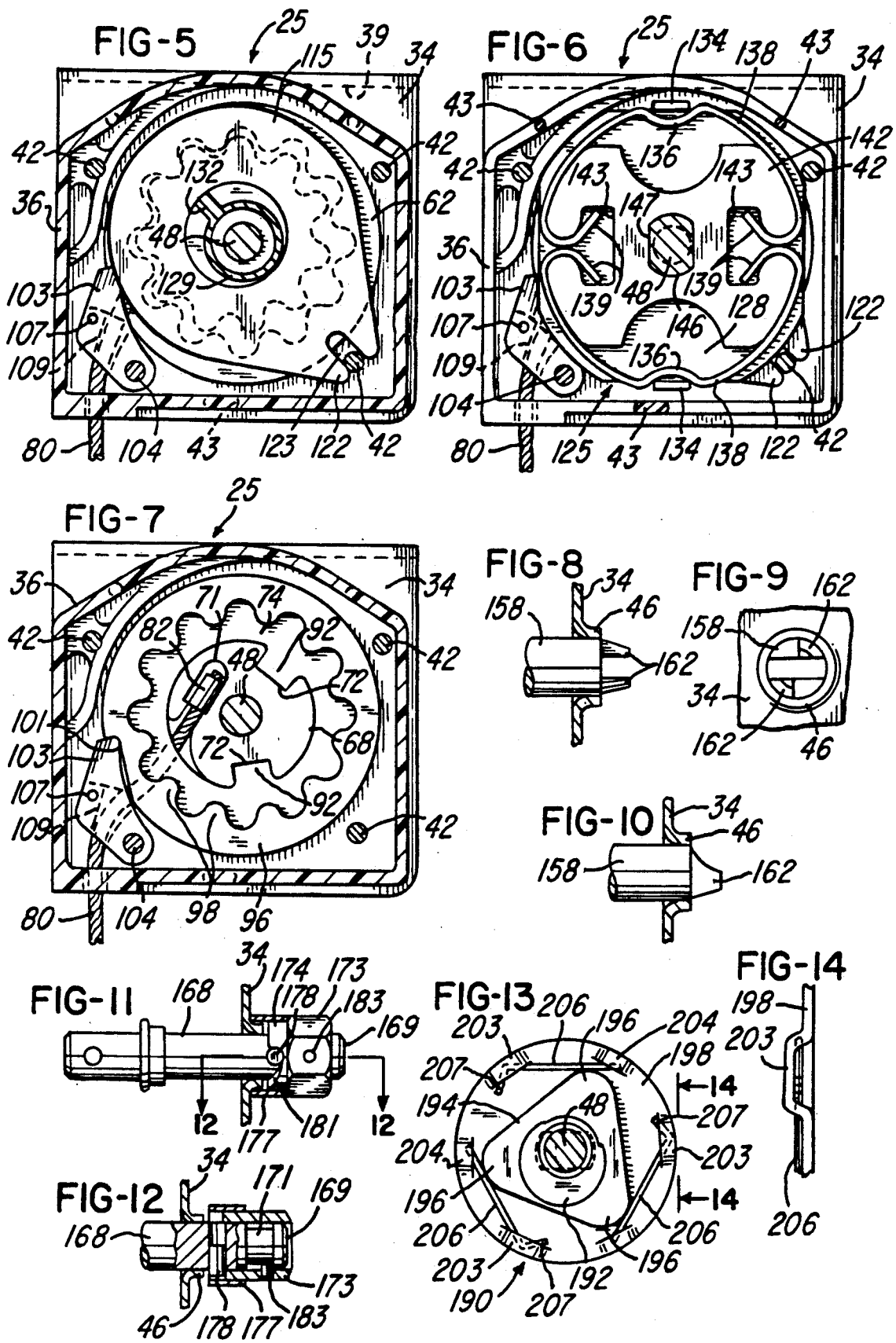

COMPACT TIRE LIFT UNIT

BACKGROUND OF THE INVENTION

In the art of spare tire lift units for motor vehicles and of the general type disclosed in U.S. Pat. Nos. RE33,303 and No. 4,969,630, the disclosures of which are herein incorporated by reference, it is desirable to minimize the size and weight of the tire lift unit in addition to simplifying its construction and assembly and thereby minimize its cost. It is also desirable to construct the unit so that when the tire lift cable is fully retracted and wound on the spool, the mechanical drive system for rotating the spool prevents backup of the spool, so that the spare tire is held firmly against the underneath side of the motor vehicle body even during substantial vibration of the vehicle. It has also been found desirable to provide the tire lift unit with one way coupling means which permit quick winding of the cable on the spool and retraction of the spare tire to its elevated stored position with the aid of a power driven tool. This minimizes the time required to assemble a spare tire onto a motor vehicle during original assembly of the motor vehicle, but prevents the tire from being removed without the use of the crank.

SUMMARY OF THE INVENTION

The present invention is directed to an improved tire lift unit of the type disclosed in above-mentioned U.S. Pat. No. 4,969,630 and which provides all of the desirable features and advantages mentioned above. In accordance with one embodiment of the invention, the tire lift unit incorporates a spool formed by two powdered metal plate members which interfit to define an annular track having a width substantially the same as the diameter of the cable so that the cable wraps upon itself in a spiral overlapping manner. One of the plate members has an integral hub portion which defines an undercut cavity for receiving a fitting secured to the inner end portion of the cable and also has a pair of recesses for receiving inwardly projecting lugs on the other plate member which also has an integrally formed ring gear. An external gear is disposed within the ring gear and is integrally formed with a control plate as a single powdered metal part, and the control plate receives a powdered metal eccentric cam supported for rotation by the drive shaft.

The eccentric cam may be integrally formed with a torque-limiting clutch cam which has lobes for engaging resilient wire springs carried by a powered metal clutch plate secured for rotation with the drive shaft. An anti-backup feature is provided by simultaneous engagement between leading and trailing surfaces on two teeth of the ring gear and corresponding trailing and leading surfaces on two adjacent teeth of the external gear. The extension of the cable and the unwinding of the spool is provided with a downstop in the form of a pawl having a passage through which the cable passes. The pawl is pivoted by the cable to engage a notch within the spool when the spool continues to rotate after the cable is fully extended.

Other features and advantages of the invention will be apparent from the following description, the accompanying drawings and the appended claims.

BRIEF DESCRIPTION OF THE DRAWINGS

FIG. 1 is a side elevational view of a tire lift unit constructed in accordance with the invention and showing the tire lift plate in section;

FIG. 2 is a section taken generally on the line 2—2 of FIG. 1;

FIGS. 3–6 are corresponding sections taken generally on the lines 3—3, 4—4, 5—5 and 6—6 of FIG. 2;

FIG. 7 is a section similar to FIG. 4 but with the external gear and eccentric cam removed;

FIG. 8 is an elevational view of a drive shaft having a one way drive coupling in accordance with a modification of the invention;

FIG. 9 is an end view of the modified drive shaft shown in FIG. 8;

FIG. 10 is a fragmentary view of the shaft end portion shown in FIGS. 8 & 9;

FIG. 11 is an elevational view of a drive shaft and one way drive coupling in accordance with another embodiment of the invention;

FIG. 12 is a fragmentary section of the one way drive taken generally on the line 12—12 of FIG. 11;

FIG. 13 is an axial view of a torque-limiting clutch assembly in accordance with another modification of the invention; and FIG. 14 is a fragmentary view taken generally on the line 14—14 of FIG. 13.

DESCRIPTION OF THE PREFERRED EMBODIMENTS

FIG. 1 shows a tire lift assembly or unit 25 which includes a housing 28 formed by a pair of inverted L-shaped sheet metal mounting plates or brackets 32 and 34 spaced on opposite sides of a frame-like housing body or shroud 36 molded of a rigid plastics material. The brackets 32 and 34 have outwardly projecting flanges 38 and 39 which have holes (not shown) for securing the brackets to the body or frame of a motor vehicle by means threaded fasteners. The mounting brackets 32 and 34 are secured together by a set of three rivets 42 having tubular end portions which are flared after the unit 25 is assembled. Each side of the shroud 36 has three locating studs 43 which project into corresponding holes within the adjacent mounting bracket.

The sheet metal plates or brackets 32 and 34 are formed with corresponding center bearing hubs 44 and 46 which rotatably support a drive shaft 48. The shaft 48 includes an enlarged cylindrical end portion 49 having a cross hole 51 for connecting an actuator, and the shaft also includes a drive portion having a pair of diametrically opposite flats 52 adjacent a circular stop flange 53.

Referring to FIGS. 2 and 7, an annular spool 60 is supported within the housing 28 for rotation on the drive shaft 48 and includes a first one-piece powdered metal plate member 62 having a cylindrical flange portion 63 with circumferentially spaced circular holes 64 to reduce material and weight. The plate member 62 also includes an integrally formed hub portion 68 which defines an undercut cavity 71 (FIG. 3) and a pair of circumferentially spaced recesses 72, all of which extend the full axial length of the hub portion 68.

The spool 60 also includes a second powdered metal annular plate member 74 which slides axially onto the hub portion 68 of the plate member 62 and cooperates with the disk or flange portion 63 to define a narrow annular track 76. The track 76 has a width substantially the same as the diameter of a flexible stainless steel cable 80 which is wound within the track 76 in a spiral overlapping manner as shown in FIG. 3. A tubular fitting 82 (FIG. 3) is crimped or secured to the inner end portion of the cable 80 and is captured within the recess 71 to connect the inner end portion of the cable to the spool 60. Referring to FIG. 1, another fitting or ferrule 84 is positively secured or crimped to the outer end portion of the cable 80 and supports a formed sheet metal lift member or plate 86. As disclosed in above-mentioned U.S. Pat. No. 4,969,630, the lift plate 86 is adapted to be inserted through a center hole within a spare tire wheel and then positioned so that the opposite shoulders 88 engage the center portion of the wheel.

Referring to FIG. 7, the one-piece powdered metal plate member 74 of the spool 60 includes a pair of circumferentially spaced lugs or tabs 92 which project inwardly into the recesses 72 within the hub portion 68 of the plate member 62. The interfitting connection of the plate members 62 and 74 prevents rotation of the plate member 74 on the hub portion 68 of the plate member 62, and the plate member 74 also retains the inner end portion of the cable 80 and fitting 82 within the cavity 71 of the hub portion 68. The plate member 74 of the spool 60 also incorporates an integrally formed internal ring gear 96 which has inwardly projecting and circumferentially spaced teeth 98 all formed as integral part of the powdered metal plate member 74.

A recess or notch 101 (FIGS. 4 & 7) is formed within the outer peripheral portion of the plate member 74 of the spool 60 and is adapted to receive a sheet metal pawl 103 which is pivotally supported by a cross pin or rivet 104. The pawl 103 is attached to a base portion 106 which is molded of a rigid plastics material and is also pivotally supported with the pawl 103 by the rivet 104. The base portion 106 includes an integrally molded pin 107 which projects through a hole within the pawl 103 and is hot-staked to secure the pawl 103 to the base portion 106.

Referring to FIG. 3, a channel or passage 109 is formed within the base portion 106 of the pawl 103, and the cable 80 extends through the passage immediately before the cable exits the housing 28 through a hole 111 within the shroud 36. During normal winding and unwinding of the cable 80 within the track 76, the pawl 103 is in a retracted position as shown in FIG. 3. When the cable 80 is fully extended (FIG. 7), the counterclockwise movement of the inner end portion of the cable with the spool 60 is effective to pivot the pawl 103 clockwise so that the pawl engages the spool 60 within the notch 101 to prevent further counterclockwise rotation of the spool. When the spool is rotated in a clockwise direction (FIG. 7) for winding the cable 80 within the track 76, the pawl 103 is cammed outwardly and pivoted by the cable to its retracted position (FIG. 3) where the pawl 103 does not interfere with rotation of the spool in either direction.

Referring to FIGS. 2, 4 and 5, a control plate 115 is formed of powdered metal and is integrally formed with an external gear 118 which is located within the internal ring gear 96 and has outwardly projecting peripherally spaced teeth 119. The one-piece control plate 115 and external gear 118 is mounted for rotation on an eccentric cam 120 which is also formed of powdered metal and is mounted for rotation on the drive shaft 48. The control plate 115 has an outwardly projecting ear portion 122 (FIG. 5) which has a slot 123 for receiving one of the rivets 42 to prevent rotation of the control plate while permitting the control plate to orbit with the external gear 118 in response to rotation of the cam 120.

Referring to FIG. 4, each of the inwardly projecting teeth 98 of the internal ring gear 96 and each of the outwardly projecting teeth 119 of the external gear 118 has leading and trailing edge surfaces. As apparent from FIG. 4, the teeth 119 have a radius of curvature larger than the radius of curvature of the teeth 98. The smaller size or radius of the rounded teeth 98 relative to the larger radius rounded teeth 119 and the shape of the teeth result in the leading and trailing surfaces of two spaced teeth 98 of the internal gear 96 being in simultaneous contact with corresponding trailing and leading surfaces on adjacent teeth 119 of the external gear 118 at the two points 124. This dual contact of the interfitting teeth 98 and 119 form an anti-backup feature for the spool 60. That is, a counterclockwise torque on the internal gear 96 (FIG. 4) due to the weight of a tire and tension within the cable 80, is ineffective to produce rotation of the external gear 118 on the cam 120.

A torque limiting or slip clutch 125 (FIG. 6) maximizes the torque for rotating the spool 60 when the cable 80 is fully retracted onto the spool within the track 76. The clutch 125 is constructed in a manner similar to the construction of the torque limiting clutch disclosed in above-mentioned U.S. Pat. No. 4,969,630. The clutch 125 includes a driven sheet metal disk or plate 128 having a center hole which receives a concentric hub or boss 129 on the cam 120 and has a keyway which receives an axially projecting key 132 on the cam 120 so that the clutch plate 128 drives the cam 120. The clutch plate 128 includes a pair of diametrically opposed ears 134 which project axially into curved portions 136 of a pair of arcuate leaf-type metal springs 138 having hook-shaped end portions 139. The springs 138 are carried by a clutch drive plate 142 which has a pair T-shaped cavities 143 for receiving and retaining the end portions 139 of the springs 138. The clutch drive plate 142 has a center hole 146 with double opposing flats 147 which receives the mating hub portion 52 of the drive shaft 48 (FIG. 2) so that the clutch plate 142 is positively driven by the drive shaft 48. In the event excessive torque is applied to the drive shaft 48, the ears 134 cam the springs 138 inwardly to permit continued rotation of the plate 142 relative to the plate 128.

The operation of the tire lift unit 25 is generally the same as the tire lift unit disclosed in above-mentioned U.S. Pat. No. 4,969,630. That is, the high mechanical advantage provided by the orbital gear drive system requires multiple rotations of the drive shaft 48 to produce one rotation of the spool 60. Thus a heavy spare tire may be raised and lowered by the tire lift unit 25 in response to relatively low torque on the drive shaft 48. As mentioned above, the down stop pawl 103 prevents further rotation of the spool 60 after the cable 80 is fully extended, and the torque limiting clutch 125 prevents the tire lift unit 25 from being damaged in the event an excessive torque is applied to the drive shaft 125 after the cable 80 is fully retracted on the spool 60 when the spare tire firmly engages the body of the motor vehicle.

Referring to FIGS. 8-10, during original assembly of the motor vehicle including the installation of the tire lift unit 25 and the spare tire, it is sometimes desirable to provide for using a power driven tool to provide for quickly retracting the cable 80 onto the spool 60 after the spare tire has been attached to the lift plate 86. A drive shaft 158 is constructed the same as the drive shaft 48 but with the addition of a one direction coupling in the form of cam-type drive lugs 162 projecting outwardly from the shaft support 46 of the combined plate and mounting bracket 34. The ramp-shaped lugs 162 provide for inserting a spade-like bit between the lugs 162 and rotating the shaft clockwise (FIG. 9) with the aid of a power tool for winding the cable 80 onto the spool 60. If the bit is rotated counterclockwise, the bit is cammed from the lugs 162 so the spool 60 may not be rotated in an opposite direction which would lower the spare tire onto the roadway surface. Thus the one way drive lugs 162 provide an anti-theft means for quickly rotating the drive shaft 158 in only one direction and with the aid of a power driven tool.

FIGS. 11 and 12 show another form of an anti-theft drive coupling for driving a shaft 168 which is constructed the same as the drive shaft 48 but includes a projecting end portion 169 with a reduced neck portion 171. The coupling for driving the shaft 168 in only one direction includes a hexagonal tubular fitting 173 having a cylindrical base portion 174 which carries a surrounding cylindrical sleeve 177. A cross pin 178 extends through a hole within the shaft 168 and has opposite end portions which engage a pair of diametrically opposite ramp or cam surfaces 181 formed within the base portion 174 of the drive coupling. A lock pin 183 is press-fitted through a hole within the fitting 173 and has an inner portion captured within the annular cavity surrounding the neck portion 171. Thus when the fitting 173 is urged inwardly on the shaft 168 and rotated in one direction, the fitting 173 rotates the drive shaft 168 due to engagement with the cross pin 178, as shown in FIG. 11. However, if the fitting 173 is rotated in the opposite direction, the fitting 173 shifts outwardly or axially on the end portion of the shaft 168 as a result of the cam surfaces 181 and until the fitting 173 rotates freely on the shaft 168. The lock pin 183 permits the fitting 173 to shift axially on the end portion 169 of the shaft 168 but prevents the fitting from being removed from the end portion, as shown in FIG. 12.

Referring to FIGS. 13 and 14, a modification of a tire lift unit constructed in accordance with the invention incorporates a torque-limiting or slip clutch 190 in place of the slip clutch 125 described above. In the modification shown in FIG. 13, an eccentric cam 192 and a clutch cam 194 are formed of powdered metal as a single part and are supported for rotation by the drive shaft 48. The clutch cam 194 has three uniformly spaced rounded cam lobes 196 and is driven clockwise (FIG. 13) by a circular clutch disk or plate 198 which is also formed of powdered metal. The plate 198 has a center hole with double flats for receiving the drive portion 52 of the drive shaft 48, and the outer peripheral portion of the clutch plate 198 has a set of peripherally spaced offset portions or pockets 203 and 204 which receive opposite end portions of three wire springs 206 each having an angular end portion 207. The wire springs 206 engage the corresponding cam lobes 196 and drive the clutch cam 194 clockwise (FIG. 13). When the cable 80 is fully retracted, due to the spare tire firmly engaging the vehicle body, and the drive shaft 48 and clutch plate 198 continue to be rotated by a hand crank connected to the drive shaft, the wire springs 206 deform outwardly around the cam lobes 196 and permit the clutch plate 198 to rotate clockwise (FIG. 13) relative to the clutch cam 194.

From the drawings and the above description, it is apparent a tire lift unit constructed in accordance with the present invention, provides desirable features and advantages. For example, the construction of the tire lift unit 25, including the powdered metal parts which combine components, significantly reduces the number of parts to produce the unit, thereby significantly reducing the costs of the parts and the time and labor required for assembling the parts. In addition, the continuous contact of the leading and trailing surfaces on the circumferentially spaced gear teeth at the two points 124, provides the drive mechanism with an anti-backup so that the cable 80 does not unwind slightly while driving the vehicle over a long period of time. Another desirable feature is provided by the downstop arm or pawl 103 which senses when the cable 80 is fully extended and stops the spool 60 from further rotation in the same direction. This protects the cable 80 from receiving a sharp bend which would result if the cable was wrapped on the spool in the wrong direction. Also, the drive couplings disclosed in connection with FIGS. 8-12 provide for quickly retracting the cable 80 and elevating the spare tire during assembly of the tire lift unit to the motor vehicle, but also prevent a person from extending the cable and lowering the spare tire without access to the crank which couples to the opposite end portion of the drive shaft. The construction of the torque-limiting clutch 190 disclosed in connection with FIGS. 13 and 14 provides a slip clutch which is simple and economical in construction and further reduces the overall cost of producing the tire lift unit.

While the forms of tire lift units herein described constitute preferred embodiments of the invention, it is to be understood that the invention is not limited to these precise forms, and that changes may be made therein without departing from the scope and spirit of the invention as defined in the appended claims.

The invention having thus been described, the following is claimed:

1. A tire lift unit comprising a drive shaft having opposite end portions, a housing having spaced walls supporting said end portions of said drive shaft for rotation, an annular spool supported by said drive shaft within said housing for rotation relative to said shaft, an elongated flexible cable having opposite end portions, means mounted on one of said end portions of said cable for supporting a tire, means connecting the opposite of said end portions of said cable to said spool, drive means having a high mechanical advantage for rotating said spool through one revolution relative to said drive shaft in response to multiple revolutions of said drive shaft, said opposite end portions of said drive shaft projecting from corresponding said walls of said housing, means for connecting a hand crank to one of said projecting end portions of said drive shaft, and a one-way coupling connected to the opposite said projecting end portion of said drive shaft and having means for rotating said drive shaft with a power tool in only one direction for wrapping said cable onto said spool independent of the hand crank.

2. A tire lift unit as defined in claim 1 wherein said coupling comprises a polygonal drive fitting mounted on said end portion of said drive shaft and adapted to be rotated by a power driven wrench, and means connecting said fitting to said shaft and including a cam for rotating said drive shaft in one direction with rotation of said fitting and for freely rotating said fitting relative to said drive shaft in the opposite direction of rotation of said fitting.

3. A tire lift unit comprising a drive shaft, a housing having spaced walls supporting said drive shaft for rotation, an annular spool supported by said drive shaft within said housing for rotation relative to said shaft, an elongated flexible cable having opposite end portions, means mounted on one of said end portions of said cable for supporting a tire, means connecting the opposite of said end portions of said cable to said spool, drive means having a high mechanical advantage for rotating said spool through one revolution relative to said drive shaft in response to multiple revolutions of said drive shaft, said drive means including an annular internal gear having circumferentially spaced inwardly projecting rounded teeth, an annular external gear disposed within said internal gear and having outwardly projecting rounded teeth interfitting between said inwardly projecting teeth, said outwardly projecting teeth each having a radius of curvature larger than the radius of curvature of said inwardly projecting teeth, each of said teeth on each of said gears having a leading surface and a trailing surface, said leading and trailing surfaces on two non-adjacent peripherally spaced said teeth of said external gear simultaneously contacting said trailing and leading surfaces of two non-adjacent circumferentially spaced said teeth of said internal gear to prevent backup of said drive means after said cable is wound on said spool and the tire is supported by said cable.

4. A tire lift unit comprising a drive shaft, a housing having spaced walls supporting said drive shaft for rotation, an annular powdered metal spool supported by said drive shaft within said housing for rotation relative to said shaft, an elongated flexible cable having opposite end portions, means mounted on one of said end portions of said cable for supporting a tire, means connecting the opposite of said end portions of said cable to said spool, drive means having a high mechanical advantage for rotating said spool through one revolution relative to said drive shaft in response to multiple revolutions of said drive shaft, said drive means including an annular internal gear formed as an integral part of said powdered metal spool and having circumferentially spaced inwardly projecting rounded teeth, an annular external gear disposed within said internal gear and having outwardly projecting rounded teeth interfitting between said inwardly projecting teeth, said outwardly projecting teeth each having a radius of curvature larger than the radius of curvature of said inwardly projecting teeth, each of said teeth on each of said gears having a leading surface and a trailing surface, said leading and trailing surfaces on two non-adjacent peripherally spaced said teeth of said external gear simultaneously contacting said trailing and leading surfaces of two non-adjacent circumferentially spaced said teeth of said internal gear to prevent backup of said drive means after said cable is wound on said spool and the tire is supported by said cable.

* * * * *